No. 679,699. Patented July 30, 1901.
J. M. MASON.
WASHER MAKING MACHINE.
(Application filed Sept. 29, 1900.)
(No Model.) 4 Sheets—Sheet 1.
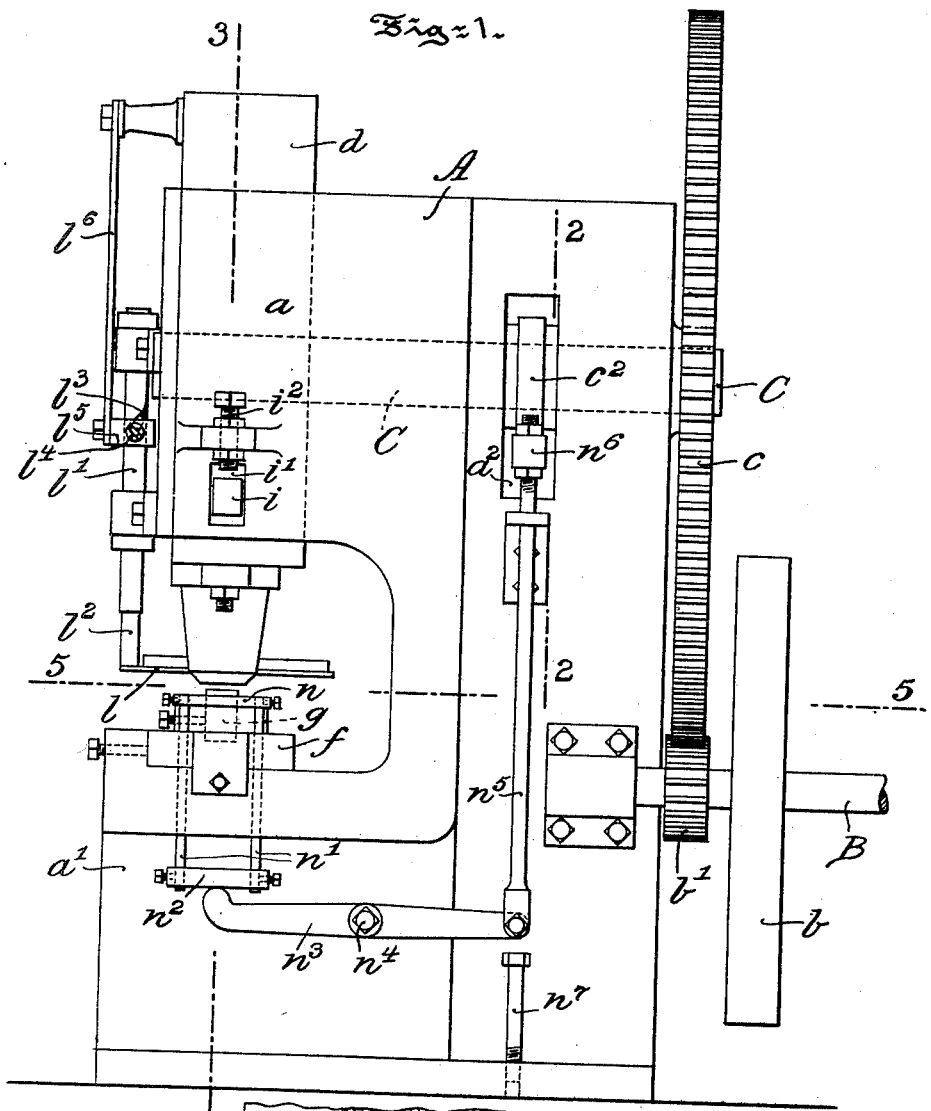
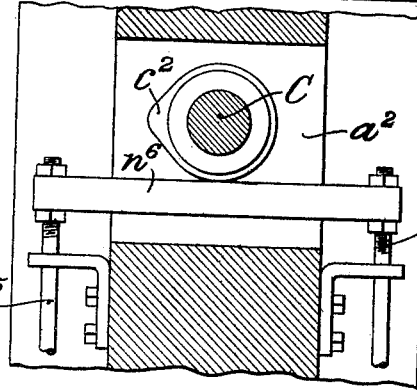
Witnesses:
Julia Ubard
Albert B. Werner
Inventor:
Joseph M. Mason
By D. F. Stewart
Attorney

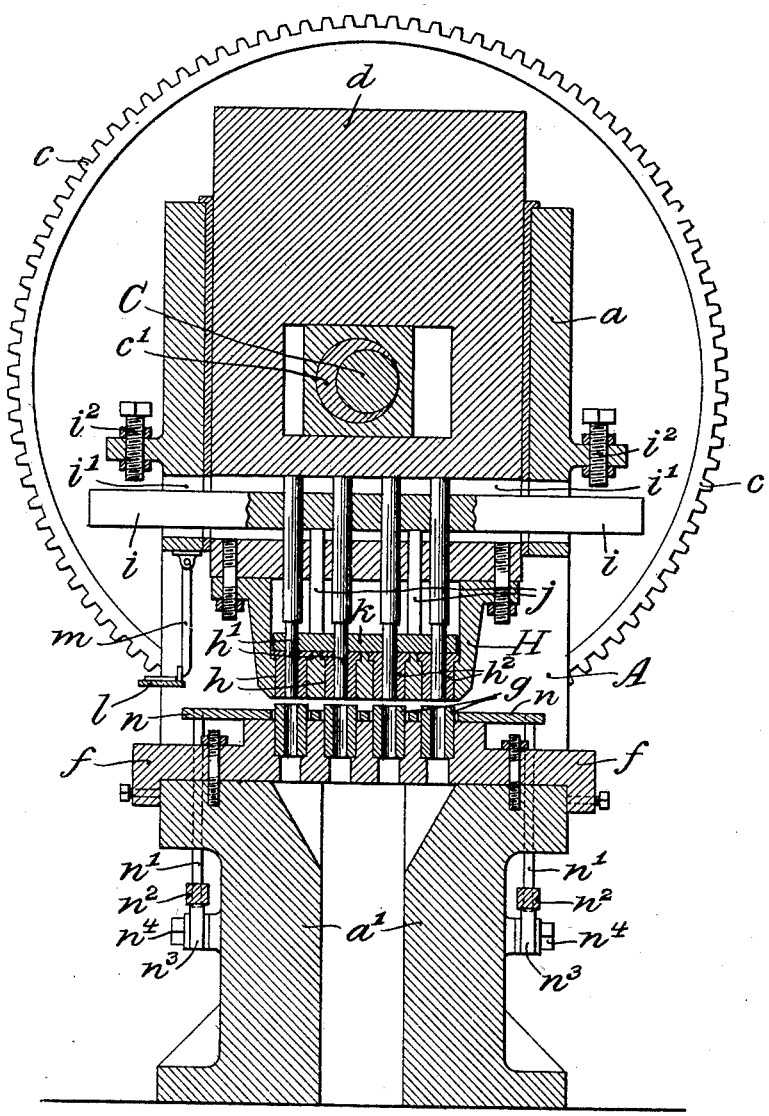

No. 679,699. Patented July 30, 1901.
J. M. MASON.
WASHER MAKING MACHINE.
(Application filed Sept. 29, 1900.)
(No Model.) 4 Sheets—Sheet 3.

Witnesses:
Julia Vibard
Albert B. Werner

Joseph M. Mason
Inventor
By D. A. Stewart
Attorney

No. 679,699. Patented July 30, 1901.
J. M. MASON.
WASHER MAKING MACHINE.
(Application filed Sept. 29, 1900.)
(No Model.) 4 Sheets—Sheet 4.

Witnesses:
Julia V. Ward
Albert B. Werner

Joseph M. Mason
Inventor
By D. H. Stewart
Attorney

THE NORRIS PETERS CO., PHOTO-LITHO., WASHINGTON, D. C.

UNITED STATES PATENT OFFICE.

JOSEPH M. MASON, OF PHILADELPHIA, PENNSYLVANIA.

WASHER-MAKING MACHINE.

SPECIFICATION forming part of Letters Patent No. 679,699, dated July 30, 1901.

Application filed September 29, 1900. Serial No. 31,559. (No model.)

*To all whom it may concern:*

Be it known that I, JOSEPH M. MASON, a citizen of the United States, residing at Philadelphia, in the county of Philadelphia and State of Pennsylvania, have invented certain new and useful Improvements in Machines for Making Washers, of which the following is a specification.

My invention relates to improvements in machines for making washers at one operation by the simultaneous action of the dies and piercing-punch; and the objects of my invention are, first, to provide a machine which shall be more simple and efficient in its mechanism than any machine heretofore in use, and, second, to so construct the machine as to enable several washers to be simultaneously punched from the same sheet of metal without unduly complicating the mechanism, thus greatly reducing the cost of the labor employed in the manufacture of the washers. I attain these objects by the mechanism illustrated in the accompanying drawings, in which—

Figure 4:
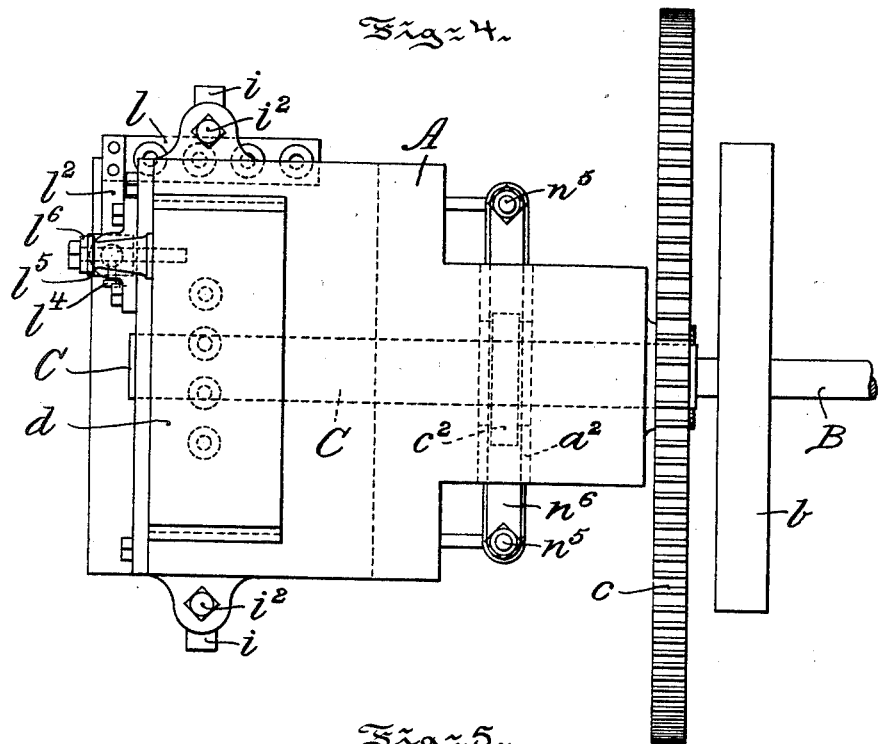
Figure 5:
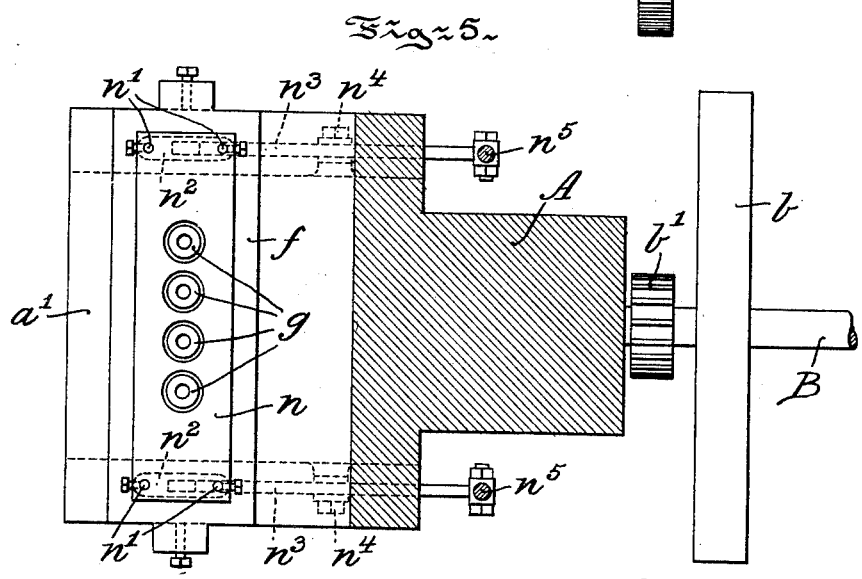
Figure 6:
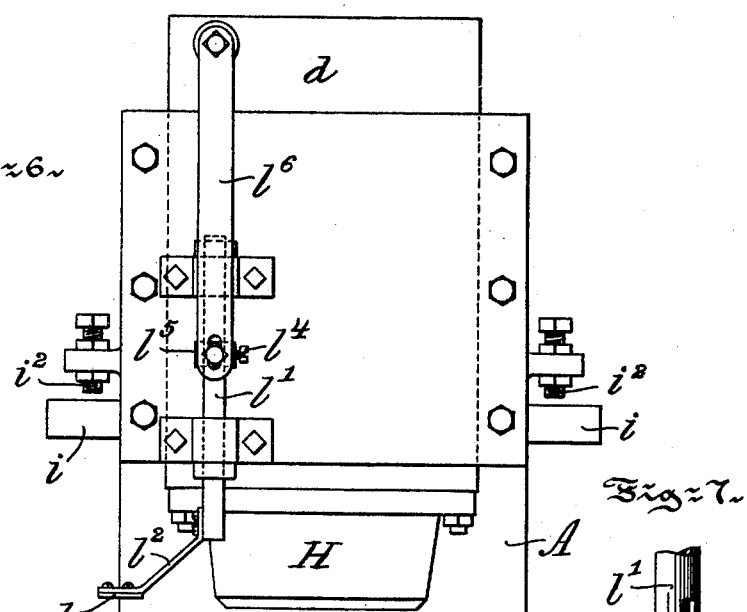
Figure 7:
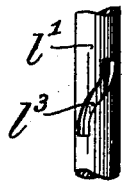
Figure 8:
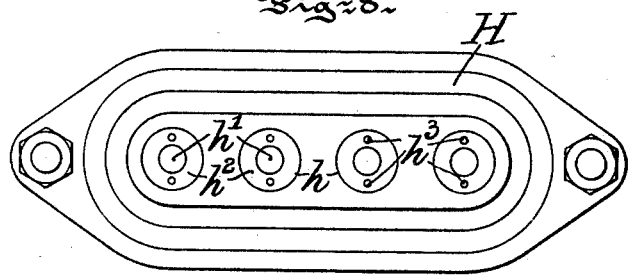
Figure 9:
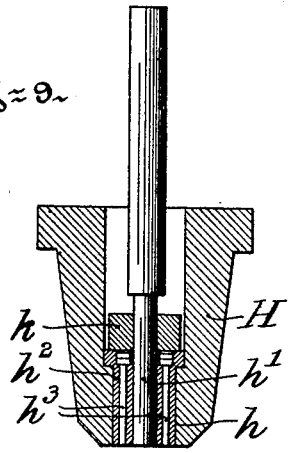

Figure 1 is the side elevation of a machine embodying the main features of my invention. Fig. 2 is a sectional view on the line 2 2 of Fig. 1, showing the cam for operating the stripping-plate for stripping the sheet metal from the lower dies after the washer has punched. Fig. 3 is a sectional view on the line 3 3 of Fig. 1. Fig. 4 is a top or plan view of the machine. Fig. 5 is a sectional view on the line 5 5 of Fig. 1, showing the arrangement of the lower dies and the stripping-plate in plan. Fig. 6 is a front elevation of the upper portion of the machine, showing more fully the means employed to operate the carrier-plate for removing the washers from the upper dies as they are discharged therefrom. Fig. 7 is a view of a portion of the vertical spindle which operates the carrier-plate, showing the helical groove, the purpose of which will hereinafter be more fully described. Fig. 8 is an underneath plan view of the upper dies and their accompanying parts. Fig. 9 is a transverse sectional view of the upper die.

Similar letters of reference refer to similar parts throughout the several views.

A represents the frame of the machine of the usual configuration of press-machines.

B is the driving-shaft, provided with the usual fly-wheel $b$ and pinion $b'$, which gears with the gear-wheel $c$ on the main shaft C of the machine.

The ram or head $d$ is adapted to be vertically reciprocated in the upper projection $a$ of the frame by means of the eccentric $c'$ on the front end of the shaft C in the well-known manner. A bed-plate $f$ rests upon the lower projection $a'$ of the frame. The wedge-shaped slides usually employed to give the bed-plate a vertical adjustment are dispensed with, and when it is necessary to raise the bed-plate blocks (not shown) can be placed between the bed-plate $f$ and the lower projection $a'$ of the frame. The bed-plate $f$ contains a series of dies $g$, arranged, preferably, in a straight line and adapted, in conjunction with the upper die H, to form the outside edges of the washers. The upper die H is preferably formed of one piece and secured to the lower side of the sliding head $d$, as illustrated in Fig. 3 of the drawings. Centrally arranged in each of the openings $h$ in the upper die H is a punch $h'$, which, in conjunction with the opening in the lower dies $g$, form the holes of the washers. Surrounding the punches $h'$ are sleeves $h^2$, which fit the openings $h$ in the upper die and are provided at their upper ends with enlarged portions to retain said sleeves in the upper die, all of which is substantially old. These sleeves are also provided with the usual pins $h^3$ to prevent the washer when ejected from adhering to the sleeve $h^2$. A horizontal bar $i$ is provided for knocking out the washers from the upper die H. It is situated in a slot $i'$, extending through the frame and head $d$, as shown in Figs. 1 and 3. The bar $i$ is restricted in its upward movement by the set-screws $i^2$ and rests upon the vertically-movable pins $j$, which in turn rest upon a bar or plate $k$, which is seated upon the enlarged ends of the sleeves $h^2$. Heretofore in machines for punching washers singly the pins $j$ have rested directly upon the sleeves $h^2$; but by interposing the plate or bar $k$ as many may be punched at the same time as may be found convenient without necessarily complicating the machine.

A carrier-plate $l$ is provided for carrying the washers after they are ejected from the upper dies to the side of the machine, said carrier-plate being attached to a vertical spindle $l'$ by means of a bracket $l^2$. The spindle $l'$ has a helical groove $l^3$, which is engaged by a set-screw $l^4$ in the nut $l^5$, said nut being connected with the movable head $d$ by means of a strap $l^6$ and adapted when the head $d$ is reciprocated to cause the spindle to be rotated a quarter-revolution, thereby bringing the carrier-plate under the dies when the washers are ejected therefrom and removing the same to the side of the machine, where they are knocked off the carrier-plate by a tripper $m$ in the usual manner, as shown in Fig. 3.

A stripper-plate $n$ strips the sheet metal out of which the washers are punched from the lower dies $g$ after the upper die H is withdrawn. This stripper-plate is supported by rods $n'$, having at their lower ends yokes $n^2$, which rest upon the front ends of levers $n^3$, pivoted at $n^4$, said levers being connected at their rear ends by connecting-rods $n^5$ to a yoke $n^6$. The yoke $n^6$ is located in an opening $a^2$ in the frame of the machine, immediately beneath and adapted to be operated by a cam $c^2$, mounted on the main shaft C. The cam $c^2$ when the head $d$ is in its raised position forces the yoke $n^6$ and connecting-rods $n^5$ downward, thereby causing the levers $n^3$ to raise the stripper-plate and strip the sheet metal out of which the washers have been punched from the lower dies $g$. The momentum of the plate operating the stripper-plate might cause the same to be lifted higher than necessary, and to control this a bolt $n^7$ is screwed into the lower part of the frame and serves to limit the range of movement of the levers $n^3$, as illustrated in Fig. 1.

Having thus described the nature of my invention, what I claim, and desire to secure by Letters Patent, is—

1. In a machine of the character described, the combination of a series of upper and lower dies and punches, sleeves adapted to force out the completed washers, a plate resting on said sleeves, pins resting on said plate, a bar resting on said pins and set-screws adapted to restrict the upward movement of said bar, all substantially and for the purposes as set forth.

2. In a machine of the character described the combination of the carrier-plate, a spindle to which said carrier-plate is attached, a helical groove in said spindle and means attached to the oscillating head of the machine for engaging said groove and causing the spindle to be rotated a portion of a revolution substantially as and for the purpose set forth.

3. In a machine of the character described, the combination of the carrier-plate, a spindle to which said carrier-plate is attached, a helical groove in said spindle, a nut provided with a set-screw adapted to engage said groove and a strap connecting said nut to the oscillating head of the machine substantially as and for the purposes set forth.

In testimony whereof I have signed my name to this specification in the presence of two subscribing witnesses.

JOSEPH M. MASON.

Witnesses:
 ALBERT B. WEIMER,
 JULIA V. WARD.